United States Patent
Beldue et al.

[19]

[11] Patent Number: 5,952,018
[45] Date of Patent: Sep. 14, 1999

[54] INJECTION MOLD CAVITY AND METHOD FOR MAKING THE SAME

[75] Inventors: Gary W. Beldue, Spencerport; George O. Lee, Brockport; Glen S. Lichtenberg; Douglas A. Van Putte, both of Rochester, all of N.Y.

[73] Assignee: Eastman Kodak Company, Rochester, N.Y.

[21] Appl. No.: 09/040,770

[22] Filed: Mar. 18, 1998

[51] Int. Cl.⁶ .......................... B29C 33/40; B29C 33/46; B29C 45/43

[52] U.S. Cl. .................. 425/556; 249/66.1; 249/134; 425/437

[58] Field of Search .................... 425/437, 556; 249/66.1, 134; 264/219, 401

[56] References Cited

U.S. PATENT DOCUMENTS

| | | |
|---|---|---|
| 4,438,065 | 3/1984 | Brown . |
| 4,521,367 | 6/1985 | Underwood . |
| 5,273,707 | 12/1993 | Carroll . |
| 5,439,622 | 8/1995 | Pennisi et al. ........................... 264/401 |
| 5,490,966 | 2/1996 | Peterson et al. . |
| 5,641,448 | 6/1997 | Yeung et al. ............................ 264/401 |
| 5,700,406 | 12/1997 | Menhennett et al. ............... 264/219 X |
| 5,807,519 | 9/1998 | Suzuki et al. ........................... 264/401 |

OTHER PUBLICATIONS

Dupont Selection Guide, by E.I. duPont de Nemours and Company (Undated).

*Primary Examiner*—Leo B. Tentoni
*Attorney, Agent, or Firm*—Susan L. Parulski

[57] ABSTRACT

An injection mold cavity and a method for fabricating an injection mold cavity. The mold cavity includes a tear-drop shaped channel and an ejection valve simultaneously formed with the fabrication of the mold cavity using a layer-additive process. The ejection valve is movable within the mold cavity and actuatable by a flow of gas through the channel to eject a molded part from the injection mold cavity. The mold cavity, including the ejection valve, is made of the same material.

3 Claims, 6 Drawing Sheets

Fig. 5
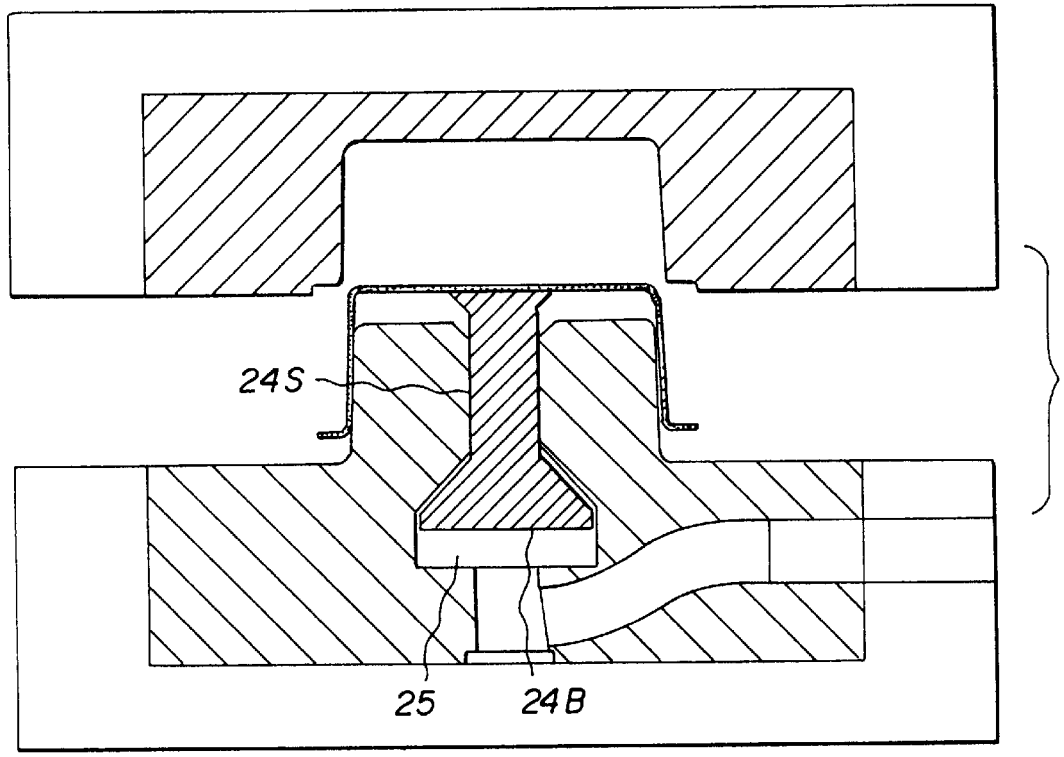
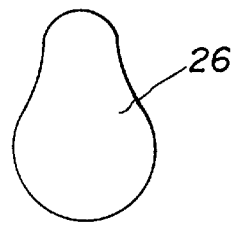
Fig. 6
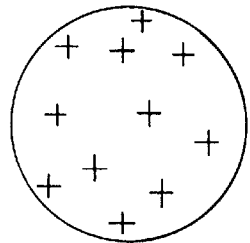
Fig. 9

INJECTION MOLD CAVITY AND METHOD FOR MAKING THE SAME

FIELD OF THE INVENTION

The present invention relates to an injection molding process and an injection molded part. More particularly, the present invention relates to an injection mold cavity and a method for providing features in a mold cavity during fabrication.

BACKGROUND OF THE INVENTION

Plastic parts can be made using an injection molding process. In the injection molding process, a molding material is injected under pressure into a mold cavity, where it solidifies in the shape of the mold cavity to form the molded part. Injection molding has a high capital investment because a steel or aluminum mold cavity is costly and time consuming to fabricate. Since there is a high capital investment, injection molding is generally not suited for small quantity fabrication, and since the mold cavity is time consuming to fabricate, injection molding generally is not suited for the early prototype stages of development of a part where significant design changes may be rapidly occurring. Accordingly, it would be advantageous to be able to inexpensively and quickly develop a mold cavity, particularly for the early prototype stages of development.

Rapid prototyping methods (e.g., Stereolithography, Laminated Object Manufacturing, Selective Laser Sintering, and Fused Deposition Modeling) have been employed to provide objects. Stereolithography is an example of a layer-additive process to enable the rapid prototyping generation of a three-dimensional object from a CAD (Computer Aided Design) database. A series of closely spaced horizontal planes are passed through the database to represent a series of closely spaced 2-dimensional cross-sections, each a different Z coordinate value. Referring to FIG. 1, a movable light source such as a laser 10, typically a computer controlled ultraviolet helium-cadmium or argon ion laser, traces the cross-sections of the computer-generated model onto a surface 12 of a vat of a laser curable liquid polymer 14, thereby hardening/solidifying the material. After the first layer is completed, a platform 16 holding the formed object 18 is lowered, leaving a new layer of the liquid polymer over the cured (i.e., hardened) material equal in thickness to the cross-section trace made by the laser. The process is repeated until the object is complete, whereby the platform is elevated and the solidified molded plastic 3-dimensional object emerges from the vat. The object 18 is placed in a post cure apparatus where it is flooded with ultraviolet radiation to effect a thorough post cure. An advantage of this process is the speed at which a computer-generated design may be turned into a three-dimensional object. The reference "Stereolithography and other RP&M Technologies; from Rapid Prototyping to Rapid Tools", by Paul F. Jacobs, ASME Press, New York, 1996, provides additional information on stereolithography.

Accordingly, it would be advantageous to employ a layer-additive process (such as stereolithography) to produce an object which is a mold cavity for producing injection molded parts. Such a mold cavity could then be employed to mold a limited quantity of parts suitable for the prototype stages of development. Questions about a molded part or molding material can be determined early in the design process by parts molded from a mold cavity fabricated using stereolithography.

Since some injection molded parts include particular features, a mold cavity produced using stereolithography must provide the particular features. For example, the mold cavity must be able to provide for part removal—that is, the mold cavity must incorporate features for removing the molded part from the mold cavity. Further features may include passageways of small size and movable components.

SUMMARY OF THE INVENTION

An object of the invention is to provide a mold cavity using a layer-additive process wherein the mold cavity includes particular features.

Another object of the invention is to provide a mold cavity including features for part removal.

Yet another object of the invention is to provide such a mold cavity which includes stationary features of small holes and passageways, and movable features.

It is still a further object of the invention to provide a method for forming part removal features within the mold cavity, wherein the part removal features are created during fabrication of the mold cavity.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an injection mold cavity made by a process of first generating a computer generated model representative of the mold cavity. The model includes a tear-drop shaped channel in communication with an ejection valve, and fabrication supports disposed within a portion of the channel. A shaft portion of the ejection valve is movable within an opening of the mold cavity, and the computer model provides a minimum clearance of 0.01 inches between the shaft portion and the opening. A layer additive process is used to fabricate the mold cavity by providing a vat of laser curable resin, tracing a cross-section of the computer generated model onto a surface of the vat of laser curable resin to solidify the resin at the cross-section, and lowering the vat. Accordingly, the channel and ejection valve are simultaneously formed with the fabrication of the mold cavity.

According to another aspect of the invention, there is provided a method for forming an injection mold cavity using stereolithography. A computer model is generated which is representative of the mold cavity. The computer model includes a tear-drop shaped channel in communication with an ejection valve. A vat of laser curable resin is provided, and a cross-section of the computer generated model is laser traced onto a surface of the vat of laser curable resin to solidify the resin at the cross-section. The vat is lowered, and the steps of tracing and lowering steps are repeated to fabricate the injection mold cavity. By this method, the channel and ejection valve are simultaneously formed with the fabrication of the mold cavity.

The present invention provides an injection mold cavity including features formed during fabrication of the mold cavity using a layer-additive process, such as stereolithography. Examples of such features include passageways of small size and movable components. Further, a mold cavity formed during this process is able to provide for part removal—that is, the mold cavity can incorporate features for removing the molded part from the mold cavity.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIG. 5 shows the cross-sectional view of the mold base of FIG. 4 illustrating the ejection position of the ejection valve.

FIG. 6 shows the cross-sectional tear-drop shape of a channel in accordance with the present invention.

FIG. 9 shows a top view of the fabrication supports of FIG. 8.

DETAILED DESCRIPTION OF THE INVENTION

Figure 1:
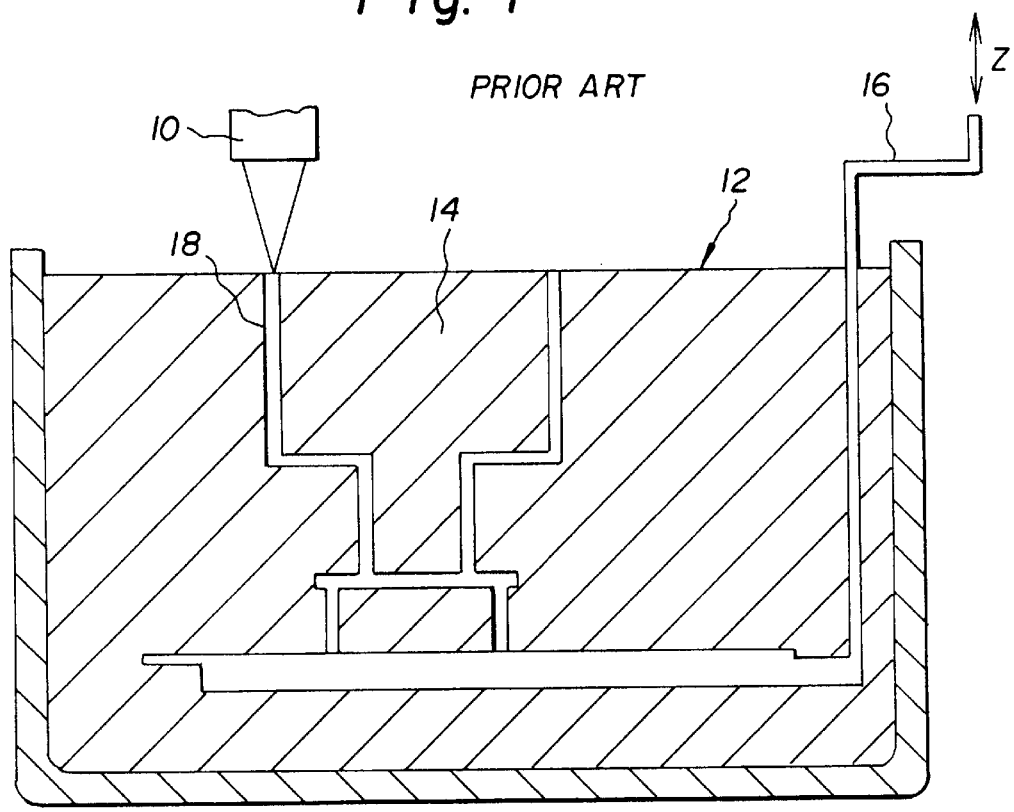
FIG. 1 shows a prior art stereolithography system.
Figure 2:
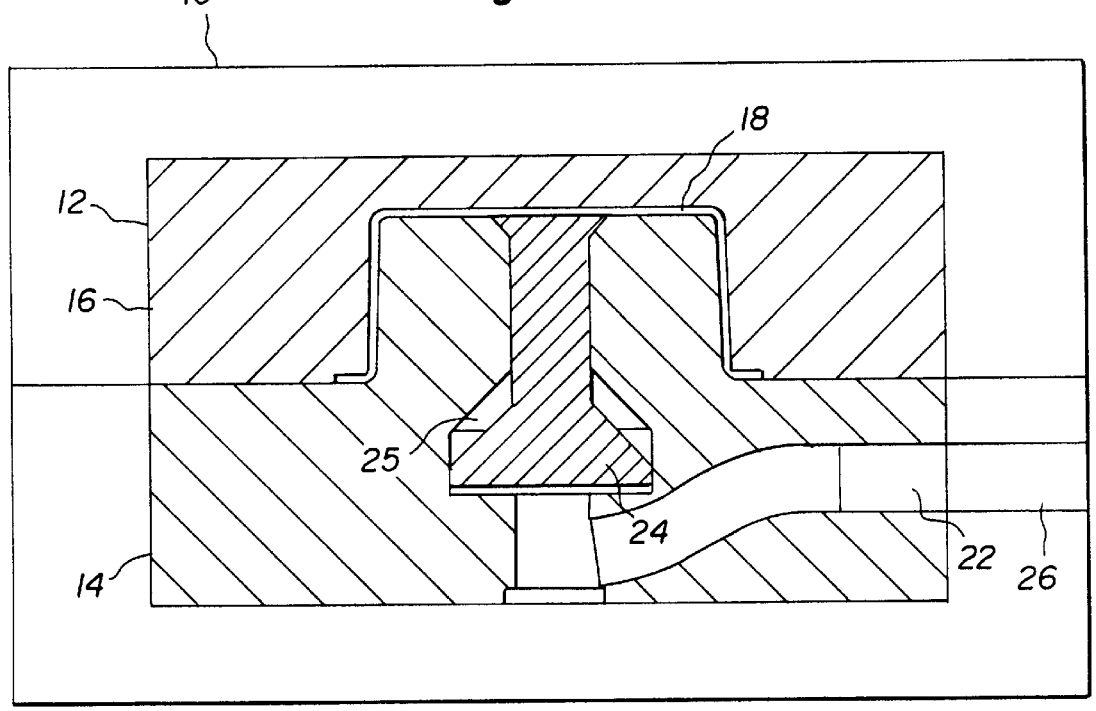
FIG. 2 shows a cross-sectional view of a first mold base containing an injection mold cavity in accordance with the present invention.

The following is a detailed description of the preferred embodiments of the invention, reference being made to the drawings in which the same reference numerals identify the same elements of structure in each of the several figures.

FIGS. 2 through 5 illustrate a mold base 10 containing an injection mold cavity 12 fabricated using a layer-additive process in accordance with the present invention. Mold cavity 12 includes a first portion 14 and a second portion 16 moveable between (i) a closed position (illustrated in FIGS. 2 and 3) wherein the first and second portions 14,16 define a mold area 18 representative of a molded part 20, and (ii) an open position (illustrated in FIGS. 4 and 5) allowing molded part 20 to be removed from mold area 18. For illustrative purposes, as illustrated in FIGS. 2 through 5, mold area 18 molds a thin-walled molded part of a U-shape. Mold cavity 12 further comprises a channel 22 in communication with an ejection valve 24. An inlet 26 in mold base 10 is in communication with channel 22 to allow a flow of gas through channel 22 to ejection valve 24. Ejection valve 24 includes a valve base 24B and a valve shaft 24S, and is movable within an opening 25. Ejection valve 24 is actuatable by a flow of gas through channel 22 to eject a molded part from the injection mold cavity, thereby facilitating the removal of molded part 20 from mold cavity 12. Ejection valve base 24B is seated within a base portion 25B of opening 25 adjacent channel 22, while valve shaft 24S is disposed within shaft portion 25S of opening 25.

Note that during molding of the molded part, the ejection valve is seated in the closed position (i.e., non-ejection position). This positioning serves to prevent molten material from entering channel 22 during molding. When a flow of gas under a predetermined pressure is introduced into channel 22, as illustrated in FIG. 5, ejection valve 24 slides to the open position to space molded part 20 from mold cavity 12. An example of ejection valve 24 is a poppet valve.

Figure 3:
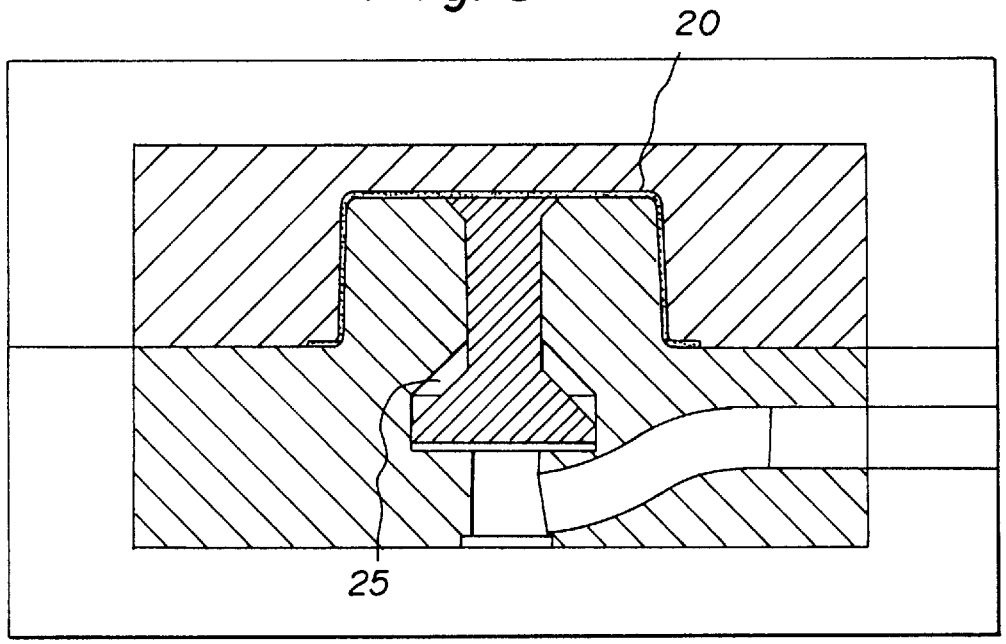
FIG. 3 shows the cross-sectional view of the mold base of FIG. 2 illustrating the molded part in the mold cavity.
Figure 4:
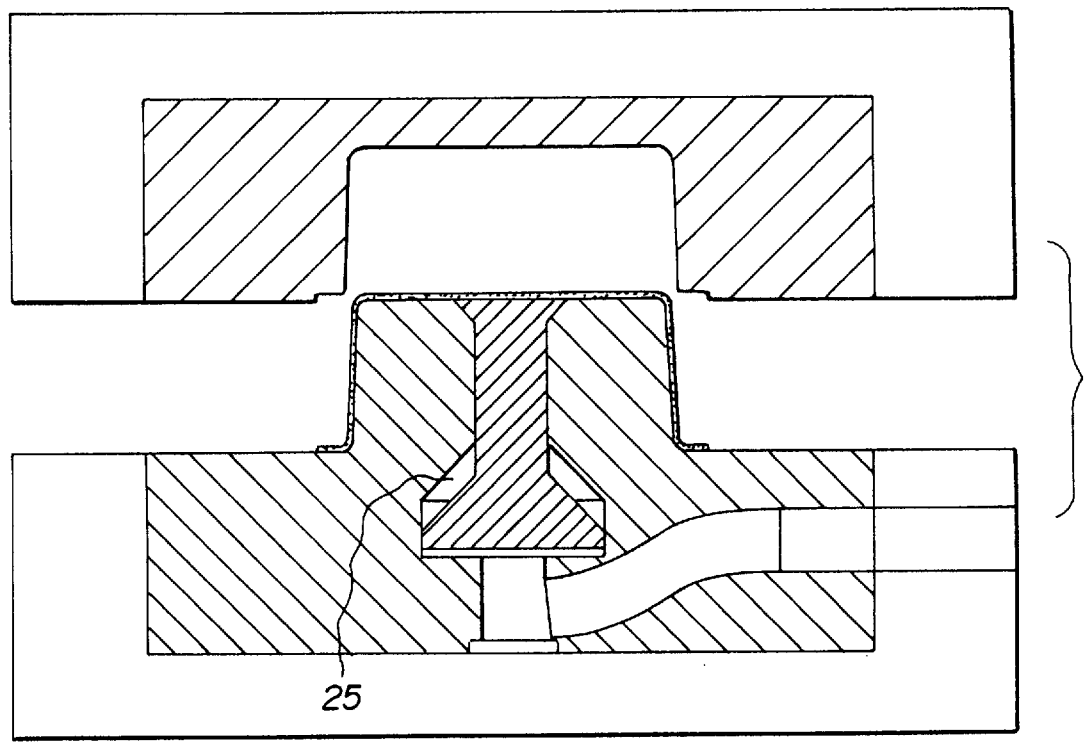
FIG. 4 shows the cross-sectional view of the mold base of FIG. 2 illustrating the separation of the two portions of the mold cavity.

Once the mold cavity is fabricated, known injection molding processes may be employed to mold the molded part. Referring again to FIGS. 2 through 5, the known process includes injecting a predetermined quantity of molten material into the mold cavity through an injection nozzle (not shown), runner (not shown) and gate (not shown) into mold area 18. The molten material is then cooled to harden the material in the mold, as illustrated in FIG. 3. First and second portions 14,16 are moved relative to each other (shown in FIG. 4), and gas is injected under pressure through channel 22 to actuate ejection valve 24 thereby ejecting the part from the mold cavity and spacing the molded part from the mold cavity (shown in FIG. 5).

A feature of the present invention is that the mold cavity's features, (e.g., channel 22 and ejection valve 24), are fabricated during the fabrication of the mold cavity, that is, simultaneous with the fabrication of the mold cavity. As such, ejection valve 24 is comprised of the same material as the mold cavity. Simultaneous fabrication provides advantages, such as reducing the manufacturing time of the mold cavity and reducing the number of manufacturing steps.

Figure 7:
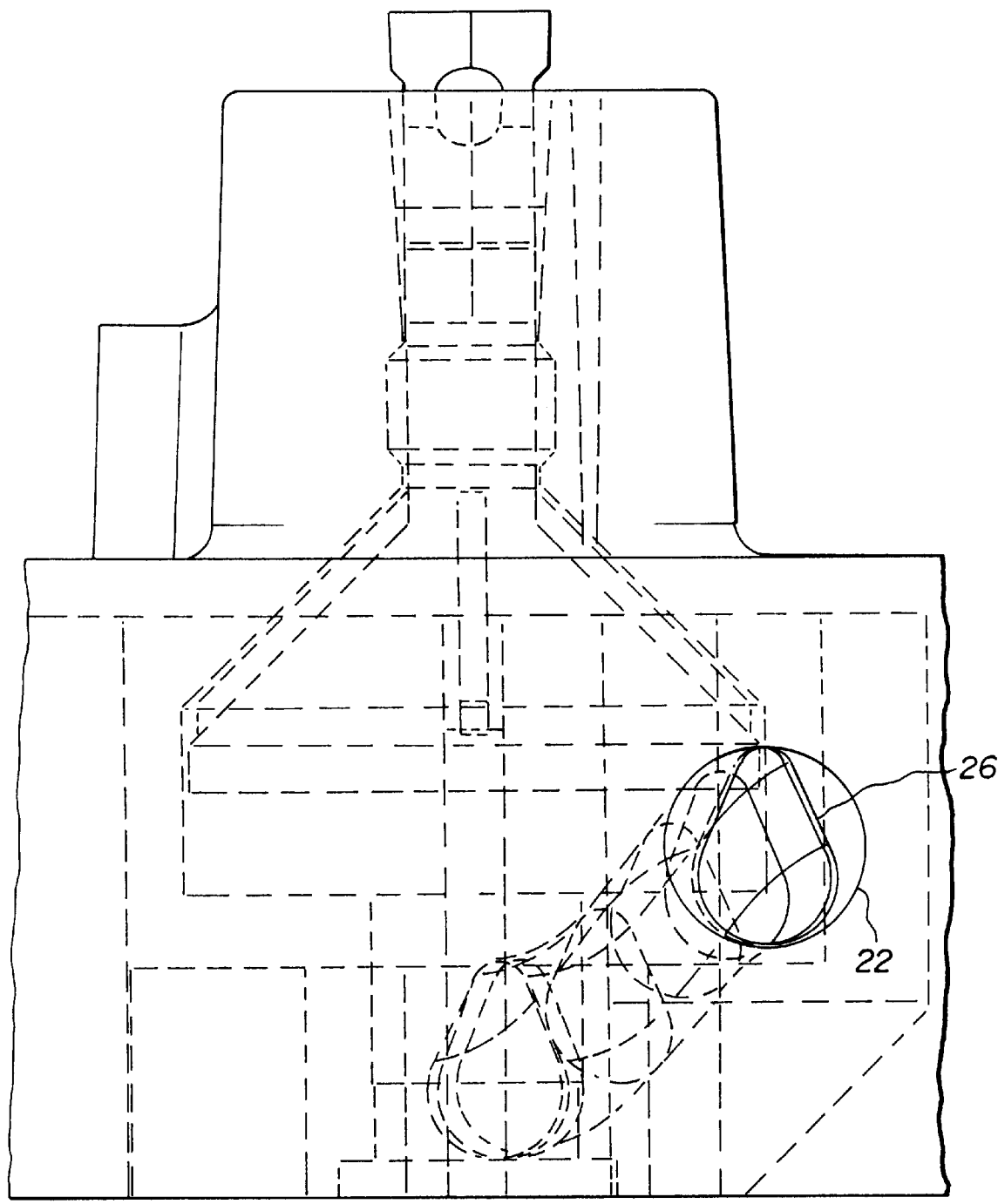
FIG. 7 shows a cross-sectional side view of a computer model of a portion of a mold cavity illustrating the tear-drop shape of the channel.

With regard to the channel, simultaneous fabrication eliminates an additional step of generating the channel, and also allows for curvature in the channel which may not be possible if the channel was added to the mold cavity after it was formed. To fabricate channel 22 simultaneous with the mold cavity, special considerations are given. More particularly, Applicants have discovered that a channel having a cross-sectional shape of a tear-drop 26 is self-supporting, and thereby eliminates the need for fabrication supports to be constructed for the fabrication of the channel. The tear-drop shape is self-supporting during the layer-additive process since each new layer is supported by a previous layer. FIG. 6 illustrates the cross-sectional tear-drop shape 26, while FIG. 7 illustrates a side view of a computer model of a portion of mold cavity illustrating the tear-drop shape 26.

Figure 8:
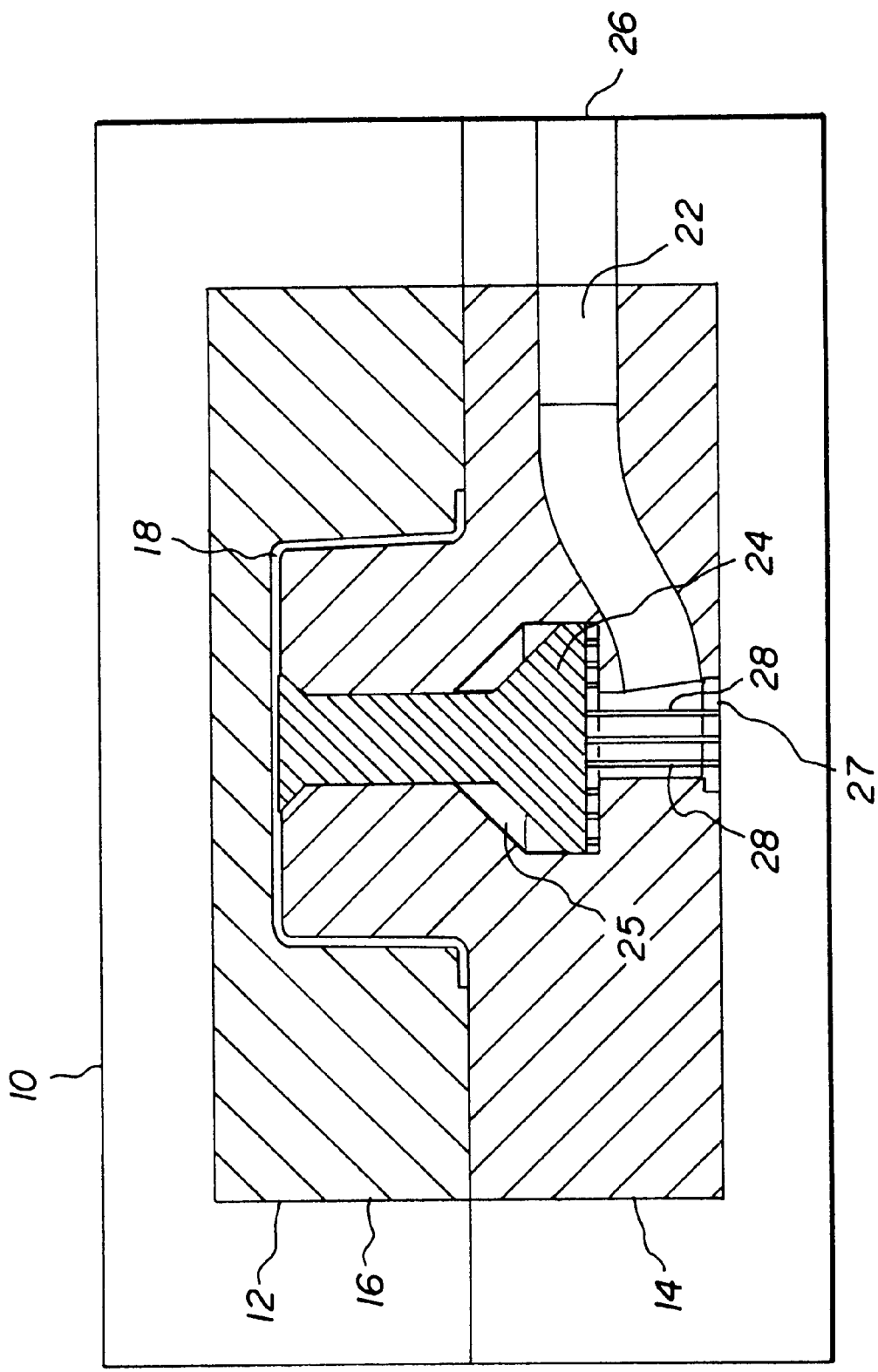
FIG. 8 shows a cross-sectional view of a the mold base of FIG. 2 illustrating fabrication supports constructed during molding in accordance with the present invention.

Referring to FIG. 8, since it may be desirable to clean channel 22 after fabrication and prior to molding, an access opening 27 to channel 22 may be formed in the mold cavity. During the molding process, a plug (not shown) can be disposed within access opening 27 to seal channel 22 to maintain pressure within channel 22.

With regard to the ejection valve, simultaneous fabrication eliminates the need for a separate component. For example, typically a separate ejection valve would be physically inserted into the mold cavity after fabrication of the mold cavity. Alternatively, a moveable ejector pin would be incorporated into the mold cavity to release the molded part. The present invention eliminates the need for the insertion of a separate ejection valve, or the incorporation of moveable pins.

The shape and location of the ejection valve is largely governed by the molded part shape, and by the rigidity or flexibility of the plastic used to mold the part. Ejection valve 24 has a shape which readily slides between the closed and open positions. Special considerations are given to fabricating ejection valve 24 simultaneous with the mold cavity when using stereolithography. As illustrated in FIG. 8, a consideration may be required in the fabrication of the ejection valve. As illustrated, ejection valve 24 is not self-supporting, that is, each new layer is not supported by a previous layer, particularly when a bottom surface of valve base 24B is generated. Accordingly, a plurality of fabrication supports 28 are modeled in the mold cavity computer model. These fabrication supports are then produced during the layer-additive process, as illustrated in FIG. 8. FIG. 9 provides a cross-sectional view of suitable fabrication supports 28. As illustrated in FIG. 9, the fabrication supports are preferably cross-hatched thin-walled beams having an "+" shape. Applicants have found such fabrication supports having a thickness of between 0.003 and 0.010 inches have been suitable. While fabrication supports 28 are fabricated during molding of the mold cavity, the fabrication supports are removed prior to using the mold cavity. The fabrication supports can be removed through access opening 27.

Figure 10:
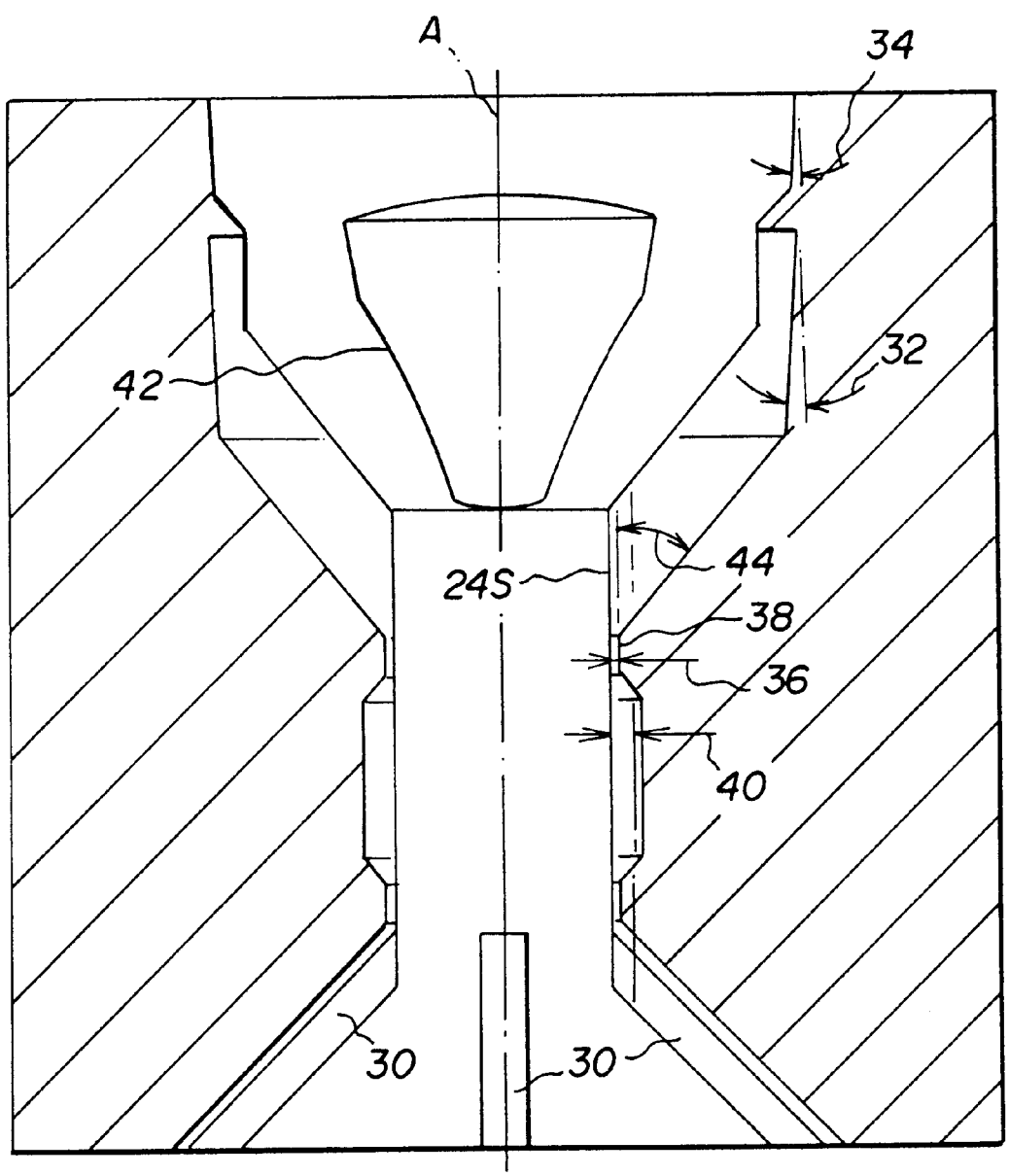
FIG. 10 shows an enlarged cross-sectional view of a portion of a second mold cavity in accordance with the present invention.

Another consideration given in the fabrication of the ejection valve, is the clearance between the ejection valve and opening 25 in which it moves. Too much clearance results in an improper (e.g., sloppy) actuation. Too little clearance results in no possible movement since the layer-additive process would polymerize the ejection valve and the opening (e.g., "grow" the parts together). FIG. 10 provides an enlarged view of a portion of a cross-sectional view of a computer model of a mold cavity in accordance with the present invention.

Applicants have discovered, that for stereolithography, a minimum clearance of 0.010 inches (indicated in FIG. 10 by reference numeral 36) must be provided between ejection valve shaft 24S and shaft portion 25S of opening 25.

Further, a relief area of approximately 0.030 inches (indicated in FIG. 10 by reference numeral 40) limits drag on valve shaft 24S when the ejection valve is actuated by the gas.

Still further, surface scallops 42 can be added on an upper portion of the ejection valve to limit the contact surface area of a seal formed between the ejection valve and the mold cavity, thereby minimizing the pressure to break the seal and move the ejection valve to the ejection position.

A 45 degree angle on a seating surface 31 of opening 25 which seats ejection valve 24 (indicated in FIG. 10 by numeral 44), eliminates the building of fabrication supports between the ejection valve and the valve seat.

Ribs 30 are disposed on an upper surface of base portion 25B of opening 25, at least every 90 degrees about the sliding axis A of the ejection valve. These ribs limit the upward travel of ejection valve 24 yet allow gas to flow when the ejection valve is in the open position. Ribs 30 provide a clearance between the ejection valve and opening 25 This clearance permits a continuous gas flow to "blow off" the molded part from the ejection valve, forcing the molded part away from the mold cavity.

Further, a 3 degree sealing angle can be developed between ejection valve 24 and opening 25 (indicated in FIG. 10 by reference numerals 32 and 34) to provide a seal. The resulting seal eliminates plastic flashing between the ejection valve and opening 25, and seals the gas pressure from below until the gas pressure drives the ejection valve upward with sufficient force to eject the molded part.

For the example shown in FIG. 10, the ejection valve moves approximately 0.25 inches between the non-ejection position and the ejection position.

Once the computer model is generated, the layer additive process is employed to fabricate the mold cavity. For stereolithography, as previously described, the process typically employs a computer controlled movable light source such as an ultraviolet helium-cadmium or argon laser to trace cross-sections of a computer-generated model onto a surface of a vat of a laser curable material, thereby hardening/solidifying the material. After the first layer is completed, a platform holding the formed object is lowered, leaving a new layer of the liquid material over the cured (i.e., hardened) material equal in thickness to the cross-section trace made by the laser. The process is repeated until the mold cavity is complete, whereby the platform is elevated and the solidified molded plastic 3-dimensional mold cavity emerges from the vat. The molded cavity is placed in a post cure apparatus where it is flooded with ultraviolet radiation to effect a thorough post cure.

In selecting a suitable laser curable material for forming an injection mold cavity, several characteristics are considered. From a usability consideration, the material must be suitable for its intended purpose. For the particular application of injection molding, the material must not interact with the molten plastic which will be injected into the mold cavity, and the material must be able to withstand the injection pressure, temperature, and releasability of the molded part from the mold cavity. From a fabrication consideration, the laser curable material must provide dimensional accuracy. Accordingly, there should be minimal shrinkage, curling, and creep distortion. Inaccuracies can adversely affect the dimensional characteristics of a small molded part, and may result in the inability to remove the molded part from the mold cavity. Applicants have found that a suitable laser curable material for the present invention is a resin such as Dupont's Somos Photopolymer 7100 and Somos Photopolymer 6110 (a high-accuracy high-productivity epoxy). Also suitable are SL5170 (an epoxy-based resin) and SL5190 from Ciba-Geigy. Using these laser curable materials, plastics such as polyethylene and polystyrene have been employed to produce the molded part.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An injection mold cavity made by the process of:

generating a computer generated model representative of the mold cavity, the model including a tear-drop shaped channel in communication with an ejection valve, the model further including fabrication supports disposed within a portion of the channel, a shaft portion of the ejection valve being movable within an opening of the mold cavity, the computer model providing a minimum clearance of 0.01 inches between the shaft portion and the opening;

using a layer additive process to fabricate the mold cavity by providing a vat of laser curable resin, laser tracing a cross-section of the computer generated model onto a surface of the vat of laser curable resin to solidify the resin at the cross-section, and lowering the vat; and simultaneously forming the channel and ejection valve with the fabrication of the mold cavity.

2. The injection mold cavity according to claim 1 wherein a surface of the opening comprising at least three ribs equidistantly spaced.

3. An injection mold cavity made by the process of:

generating a computer model representative of the mold cavity, the model including a tear-drop shaped channel in communication with an ejection valve, the model further including fabrication supports disposed within a portion of the channel, a shaft portion of the ejection valve being movable within an opening of the mold cavity, the computer model having a minimum clearance of 0.01 inches between the shaft portion and the opening;

using a layer-additive process to fabricate the injection mold cavity from the computer model; and simultaneously forming the channel and ejection valve with the fabrication of the mold cavity.

* * * * *